United States Patent [19]
Dick

[11] 4,077,601
[45] Mar. 7, 1978

[54] ADJUSTABLE PINCH CLAMP
[76] Inventor: George M. Dick, 1785 Trenton St., Denver, Colo. 80220
[21] Appl. No.: 749,816
[22] Filed: Dec. 13, 1976
[51] Int. Cl.² .............................................. F16K 7/06
[52] U.S. Cl. ..................................... 251/9; 24/134 R; 81/331; 251/107
[58] Field of Search ................... 251/4, 6, 9, 107, 108, 251/109; 24/134 R, 134 KA, 134 KB, 134 L, 134 P, 132 WL; 81/318, 324, 325, 327–331

[56] References Cited
U.S. PATENT DOCUMENTS

| 985,811 | 3/1911 | Kellam | 251/9 |
| 1,488,759 | 4/1924 | Loftus | 81/331 |
| 2,009,907 | 7/1935 | Teuber | 251/9 |
| 2,010,229 | 8/1935 | Goff et al. | 251/9 X |

FOREIGN PATENT DOCUMENTS

| 604,686 | 7/1948 | United Kingdom | 251/9 |

Primary Examiner—Martin P. Schwadron
Assistant Examiner—Richard Gerard
Attorney, Agent, or Firm—Max L. Wymore

[57] ABSTRACT

An inexpensive adjustable pinch clamp or valve for use on flexible conduits carrying a fluid having an adjustable locking cam to maintain a selected closure of the conduit.

2 Claims, 7 Drawing Figures

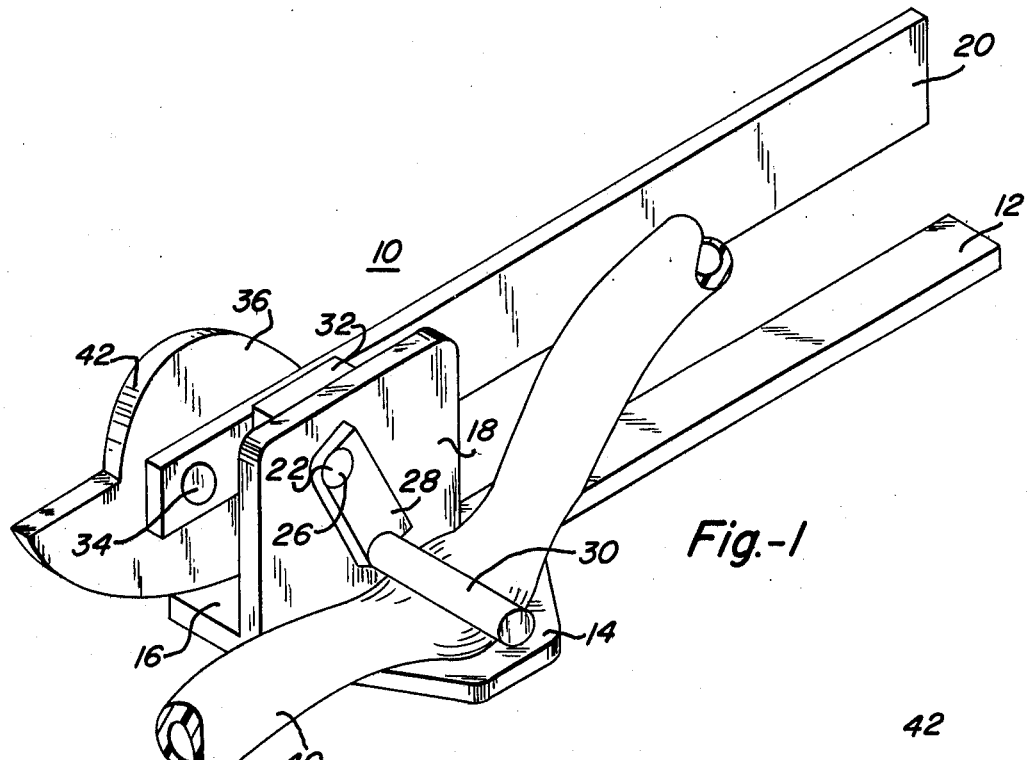
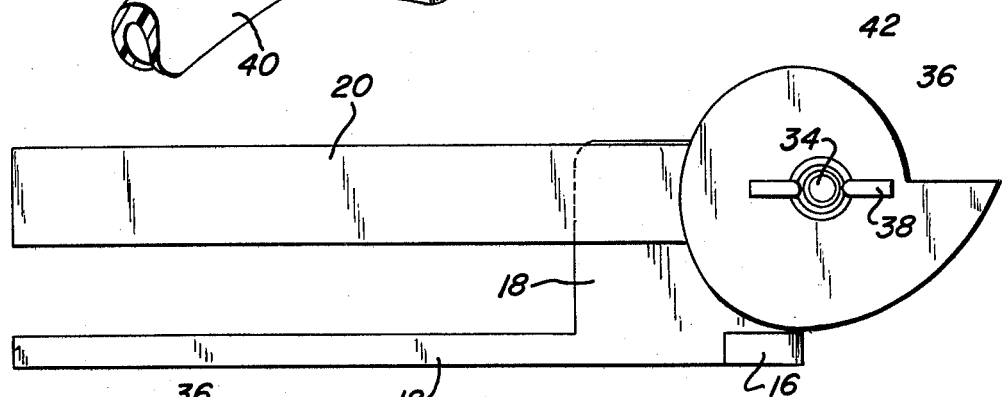
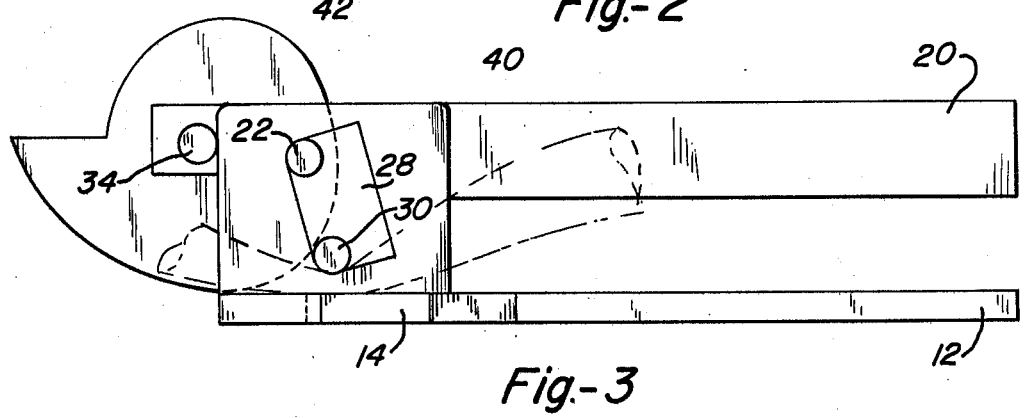

ADJUSTABLE PINCH CLAMP

BACKGROUND OF THE DISCLOSURE

In the past there have been numerous attempts to provide clamping arrangements to provide a selected shut-off of a flexible hose, such as a garden hose. Most of these devices have been either a full-on or a full-off device such that the user has no control over the rate of flow of fluid, i.e., water, through the hose. Any devices which provide for other than full-off or full-on required expensive machine operations to produce screw threads and the like.

The present invention has as its principal object to overcome these deficiencies of the prior art devices.

A further object of the present invention is to provide a noncomplex hose clamp that can be produced of inexpensive materials such as plastics.

A still further object of the invention is to provide a new and improved inexpensive hose clamp capable of selectively regulating the rate of flow of a fluid through the hose.

Other and further objects and advantages of this invention will become more apparent as the description advances taken together with the drawings wherein:

FIG. 1 is a perspective view of the improved hose clamp of the invention;

FIG. 2 is a side elevation thereof;

FIG. 3 is opposite side elevation thereof showing the clamp in closed position;

The control of fluid through a flexible conduit is very important as in the use of a garden hose but can have other applications such as in certain chemical processes and analysis as well as possibly in certain medical, pharmaceutical or surgical procedures. In most instances, the clamp should be fast acting as well as positive in its function. In gardening use as well as say surgical use, the cost of a clamp is important both as to initial cost consideration and also in surgical procedures, the disposability of the clamp after use to avoid sterilization problems.

Figure 4:
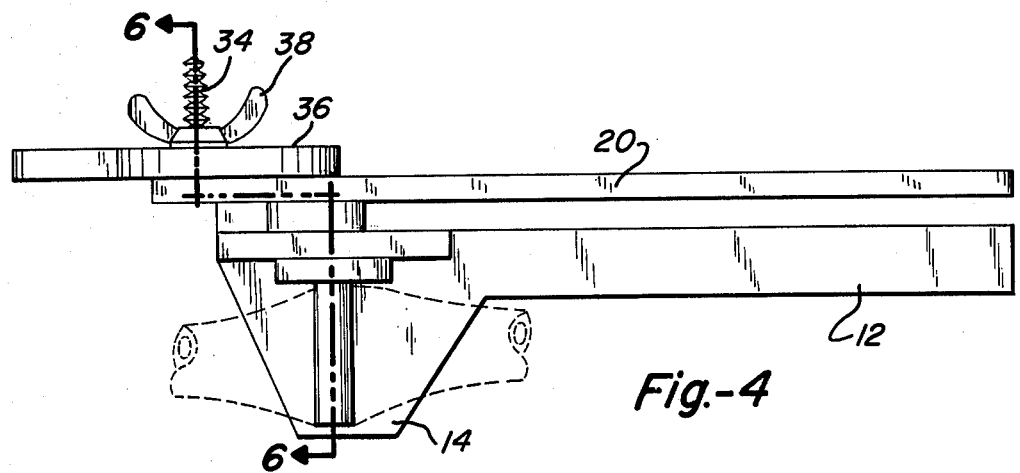
FIG. 4 is a top plan view thereof.
Figure 6:
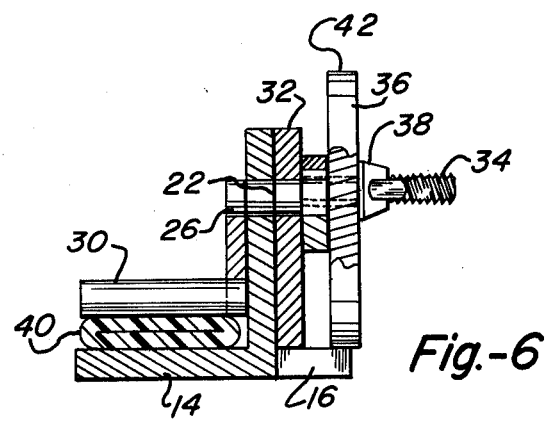
FIG. 6 is a view along line 6—6 of FIG. 4.
Figure 7:
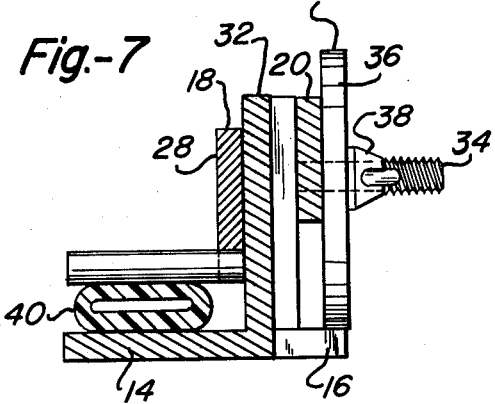
FIG. 7 is a view along line 7—7 of FIG. 5.
Figure 5:
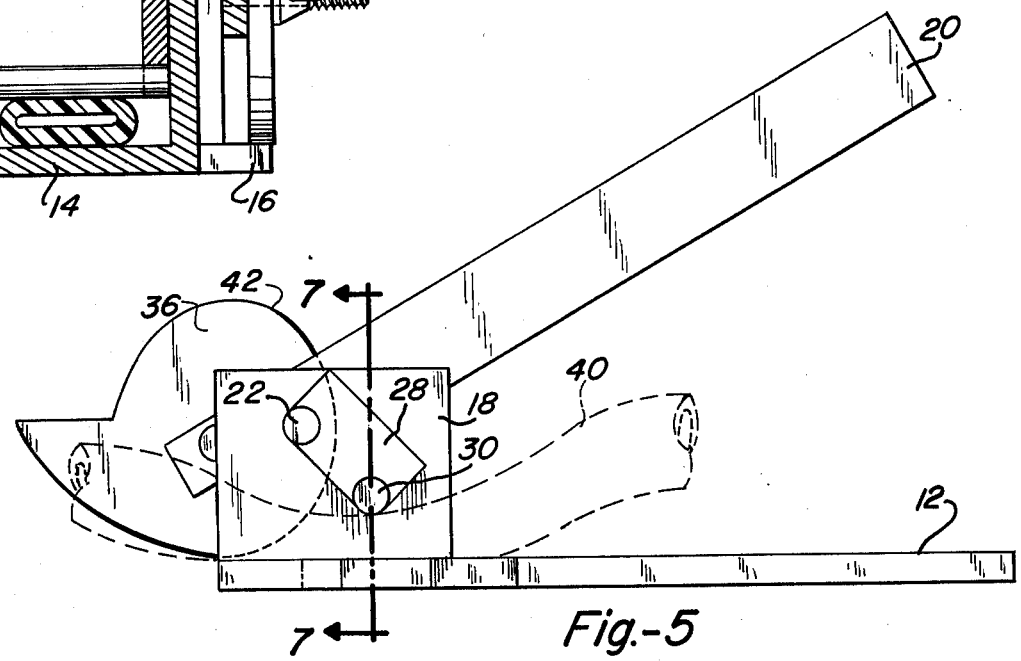
FIG. 5 is a side elevation thereof showing the clamp in a partially closed position.

The clamp of the present invention is seen to meet all of these requirements and more. Referring to the figures, clamp 10 comprises a fixed handle 12 having expanded base portions 14 and 16 at one end extending to either side an upright support member 18. Movable handle 20 is pivotally mounted on the upright support member 18 by means of a shaft 22 positioned in hole 24. One end 26 of the shaft 22 extends through the hole 24 to one side of the support member 18 and to which end of the shaft 22 is connected a crank arm 28 with the end thereof opposite shaft 22 supporting an extension 30 which may be of cylindrical configuration or such other shape as is convenient. As will be best seen in FIGS. 4, 6 and 7, the other end of the shaft 22 is secured to the movable handle 20 by suitable means and a spacer 32 is positioned on shaft 22 between the upright 18 and movable handle 20. The end of the movable handle beyond the pivot point of shaft 22 is provided with a stub shaft 34 having a cam member 36 which has a cam surface 42 mounted thereon and secured with a wing nut 38. In use, the wing nut 38 is loosened and the cam member 36 rotated to permit movable handle 20 to be pivoted about shaft 22 to raise the extension 30 above the base portion 14 a sufficient amount to span a flexible hose 40, shown dotted. The handle 20 is then rotated to move extension 30 closer to base 14, pinching the hose therebetween. When the desired degree of closure of the hose is accomplished, partial as in FIG. 7 or complete as in FIG. 6, then cam member 36 is rotated until the base 16 is engaged and the wing nut 38 tightened to hold the movable handle 20 and extension 30 in the selected position to maintain the selected closure of the hose. To change the hose closure, the wing nut is loosened and the cam member is rotated until the movable handle can be moved. When the movable handle is again positioned as desired, the cam member is rotated until engagement thereof with base 16 and the wing nut 38 again tightened.

Thus, there is provided a variable pinch clamp, which when used in conjunction with a flexible hose, provides an adjustable valve therefor that can be manufactured of plastic, metal or such other material as is convenient. Such valve may be used in surgical applications since it is non-contaminating of the controlled fluid and being relatively inexpensive, it can be used as a disposable valve while avoiding the necessity of sterilization.

What is claimed is:

1. In an adjustable clamp, the combination of:
   a relatively fixed handle means having an upright member positioned adjacent one end with a laterally positioned base member extending to each side thereof;
   a movable handle means pivotally connected to one side of the upright member by means of a shaft journalled therein;
   a crank arm with one end thereof connected to the shaft positioned to the other side of the upright member, with said crank arm having an extension connected to the end thereof opposite the shaft, extending substantially parallel thereto and adapted to cooperate with the base member to clamp a conduit therebetween; and,
   movable cam means mounted near the one end of the fixed handle means and adapted to engage a portion of the base member to control the opening movement of the movable handle means relative to the fixed handle means and thus the crank arm extension with respect to a portion of the base member.

2. The combination of claim 1 wherein the cam member is mounted for rotation on said movable handle means to selectively position the movable handle means with respect to the fixed handle means.

* * * * *